United States Patent
Huang et al.

(10) Patent No.: US 7,899,635 B2
(45) Date of Patent: Mar. 1, 2011

(54) SAMPLING INSPECTION METHOD

(75) Inventors: Kai-Ping Huang, Tainan County (TW); Sung-Lin Tsai, Hsinchu (TW); Michael Kian Ann Wee, Singapore (SG); Boon-Wah Chong, Singapore (SG)

(73) Assignee: United Microelectronics Corp., Hsinchu (TW)

( * ) Notice: Subject to any disclaimer, the term of this patent is extended or adjusted under 35 U.S.C. 154(b) by 245 days.

(21) Appl. No.: 12/233,942

(22) Filed: Sep. 19, 2008

(65) Prior Publication Data

US 2010/0076584 A1    Mar. 25, 2010

(51) Int. Cl.
*G06Q 99/00* (2006.01)
*G01D 21/00* (2006.01)
*G06F 19/00* (2006.01)
*G06F 17/40* (2006.01)

(52) U.S. Cl. .................. 702/83; 438/14; 700/109; 702/182; 702/187; 705/7

(58) Field of Classification Search .................. 438/14; 700/90, 95, 108, 117; 702/1, 33, 34, 81, 702/83, 84, 127, 182, 183, 185, 187, 189; 705/1.1, 7, 11
See application file for complete search history.

(56) References Cited

U.S. PATENT DOCUMENTS

| 2,883,255 A | * | 4/1959 | Anderson ................. 346/34 |
| 5,896,294 A |   | 4/1999 | Chow et al. |
| 6,577,972 B2 |  | 6/2003 | Yanaru et al. |

* cited by examiner

*Primary Examiner*—Edward R Cosimano
(74) *Attorney, Agent, or Firm*—J.C. Patents

(57) ABSTRACT

A sampling inspection method is provided. The sampling inspection method is adapted for a multi-product production line including a plurality of tools. The sampling inspection method includes the steps of: providing a tool record, which records a sampling data of each of the tools; then checking each sampling data recorded in the tool record, and finding out at least one unsampled tool from the tools; then defining a plurality of product lots as being performed with process operations by at least one of the at least one unsampled tool; and determining at least one of the product lots for performing a sampling inspection.

15 Claims, 4 Drawing Sheets

| A { | A01 07/09/30 15:30 | A02 07/09/30 16:00 | A03 07/09/30 16:00 | A04 07/09/30 15:00 | P01 07/09/30 20:00 | P02 07/09/30 22:00 | P03 07/09/30 20:31 | P04 07/09/30 18:15 | P05 07/09/30 16:27 | P06 07/09/30 18:21 | } P |
|---|---|---|---|---|---|---|---|---|---|---|---|
| | P07 07/09/30 15:51 | P08 07/09/30 17:32 | P09 07/09/30 15:30 | P10 07/09/30 14:30 | P11 07/09/30 15:31 | P12 07/09/30 19:36 | P06 07/09/30 17:32 | P07 07/09/30 14:31 | ST01 07/09/30 15:51 | ST02 07/09/30 21:00 | |
| | ST03 07/09/30 23:00 | ST04 07/09/30 23:30 | ST05 07/09/30 18:15 | ST06 07/09/30 15:30 | ST07 07/09/30 15:52 | ST08 07/09/30 20:31 | ST09 07/09/30 10:02 | ST10 07/09/30 18:21 | ST11 07/09/30 13:31 | ST12 07/09/30 15:11 | } ST |
| C { | ST13 07/09/30 14:31 | ST14 07/09/30 20:31 | C01 07/09/30 00:00 | C02 07/09/30 15:51 | C03 07/09/30 00:30 | C04 07/09/30 01:30 | C05 07/09/30 23:24 | C06 07/09/30 15:51 | C07 07/09/30 19:36 | SI01 07/09/30 15:30 | } SI |
| PA { | SI02 07/09/30 19:36 | PA01 07/09/30 16:57 | PA02 07/09/30 15:30 | PA03 07/09/30 16:27 | PA04 07/09/30 13:52 | PA05 07/09/30 18:54 | PA06 07/09/30 15:11 | PA07 07/09/30 16:57 | PA08 07/09/30 17:32 | PA09 07/09/30 20:31 | |
| | PA10 07/09/30 09:32 | PA11 07/09/30 18:15 | PAD1 07/09/30 15:11 | SIN01 07/09/30 18:41 | SIN02 07/09/30 13:57 | SIN03 07/09/30 18:21 | SIN04 07/09/30 12:52 | SIN05 07/09/30 19:36 | SIN06 07/09/30 16:27 | SIN07 07/09/30 23:24 | } SIN |
| H { | SIN08 07/09/30 16:27 | H06 07/09/30 15:51 | H07 07/09/30 13:31 | H08 07/09/30 17:32 | H09 07/09/30 16:57 | H10 07/09/30 18:15 | H11 07/09/30 16:27 | H12 07/09/30 12:52 | H01 07/09/30 10:17 | H02 07/09/30 18:21 | |

SAMPLING INSPECTION METHOD

BACKGROUND OF THE INVENTION

1. Field of the Invention

The present invention generally relates to a sampling method, and more particularly, to a sampling inspection method.

2. Description of Related Art

Typically, a semiconductor production line may be carried out with a plurality of process steps, e.g., film preparing step, microlithography process step, etc. Besides the process steps, the semiconductor production line is usually carried out with a plurality of inspection steps for inspecting products of each of the process steps.

In each inspection step, a process performance of a product lot with respect to a process step is usually deducted as either acceptable or defective by inspecting physical characteristics of every product or semi-product of the production lot. Currently, most inspections performed on production lines are sampling inspections. In a typical sampling inspection procedure, different sampling inspection ratios are set for different machine types regarding different process steps. Products of different lots are then randomly sampled in accordance with the sampling inspection ratios for inspection. When there are only a few machines performing a same process step in a production line, such a sampling inspection method performed to different production lots in accordance with the sampling inspection ratios is feasible, because each of the machines has an approximate probability to be sampled for inspection within a short period when performing each of the process steps. However, when the production line is in a large scale, and there are many machines employed in the production line, the sampling inspection method performed to different production lots in accordance with the sampling inspection ratios may result blind spots which may be sampled for inspection after too long a time.

In such a way, when a processing failure occurs in a machine, which causes defective products in a same lot of products, while unfortunately it happened that the process performance of the machine has not yet been sampled for inspection, the production yield will be affected, and the reliability of the inspection will be impaired. However, it is almost impossible to one by one inspect process performance of each of the multiple machines of the large scale production line, because it inevitably increases the complexity of inspection procedure and consumes too much time on the inspection procedure.

SUMMARY OF THE INVENTION

Accordingly, the present invention is directed to provide a sampling inspection method. The sampling inspection method is adapted for sampling each tool for inspection for at least one time within a predetermined inspection cycle, so as to improve a reliability of the sampling inspection.

The present invention is further directed to provide a sampling inspection method, for reducing the time used sampling inspection, and thus improving the production capability.

The present invention provides a sampling inspection method, adapted for a multi-product production line including a plurality of tools. The sampling inspection method includes the steps of: providing a tool record, which records a sampling data of each of the tools; then checking each sampling data recorded in the tool record, and finding out at least one unsampled tool from the tools; then defining a plurality of product lots as being performed with at least one process operations by at least one of the unsampled tools; and determining at least one of the product lots for performing a sampling inspection.

According to an embodiment of the present invention of the sampling inspection method, each sampling data records a latest inspection time of a corresponding tool.

According to an embodiment of the present invention of the sampling inspection method, a process tool path of the determined one of the product lots for performing the sampling inspection includes at least two unsampled tools.

According to an embodiment of the present invention of the sampling inspection method, the step of determining at least one of the product lots for performing the sampling inspection further includes: determining one of the product lots as a prior sampling product lot, according to a priority selecting rule. According to an aspect of the embodiment, the priority selecting rule includes: the prior sampling product lot corresponding to a product having a maximum production amount. According to another aspect of the embodiment, the priority selecting rule includes: the prior sampling product lot having a ready-to-inspect recipe. According to a further aspect of the embodiment, the priority selecting rule includes: a process tool path of the prior sampling product lot including most unsampled tools.

According to an embodiment of the present invention of the sampling inspection method, the tools recorded in the tool record are grouped into a plurality of tool groups according to a process type performed by each of the tools, in which each of the tool groups has a predetermined inspection cycle. The step of finding out at least one unsampled tool from the tools further includes: in the predetermined inspection cycle corresponding to each of the tool group, finding out at least one of the tools as the unsampled tool, and a corresponding sampling data of the unsampled tool being marked as unsampled.

According to an embodiment of the present invention of the sampling inspection method, the tools include a process machine.

According to an embodiment of the present invention of the sampling inspection method, the tools include a process chamber.

The present invention further provides a sampling inspection method, adapted for a multi-product production line including a plurality of tools. The sampling inspection method includes the steps of: providing a tool record, which records a sampling data of each of the tools; then checking each sampling data recorded in the tool record for finding out at least one unsampled tool from the tools; then, setting a process tool path which includes at least two unsampled tools; then predetermining a product lot according to the process tool path; then, making the product lot to complete a product manufacturing procedure according to the process tool path; and performing a sampling inspection to inspect the product lot.

According to an embodiment of the present invention of the sampling inspection method, each sampling data records a latest inspection time of a corresponding tool.

According to an embodiment of the present invention of the sampling inspection method, the tools recorded in the tool record are grouped into a plurality of tool groups according to a process type performed by each of the tools, in which each of the tool groups has a predetermined inspection cycle. The step of finding out at least one unsampled tool from the tools further includes: in the predetermined inspection cycle corresponding to each of the tool group, finding out at least one of the tools as the unsampled tool, and a corresponding sampling data of the unsampled tool being marked as unsampled.

According to an embodiment of the present invention of the sampling inspection method, the tools include a process machine.

According to an embodiment of the present invention of the sampling inspection method, the tools include a process chamber.

According to an embodiment of the present invention of the sampling inspection method, a specific product lot is sampled upon the condition of knowing the sampling data of the uninspected tools, and therefore all tools in operation of the production line can be sampled for inspection within a predetermined cycle for at least one time. Further, the product lots can be passively sampled for inspection, or actively sampled by setting a process tool path to select a specific product lot for inspection, so as to inspect process performances of a plurality of uninspected tools via a single sampling inspection process. In such a way, the present invention is adapted for simplifying the sampling inspection procedure and saving times spend on sampling inspection, and thus improving the production capability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is schematic diagram illustrating a tool record according to an embodiment of the present invention.

DESCRIPTION OF THE EMBODIMENTS

Figure 1:
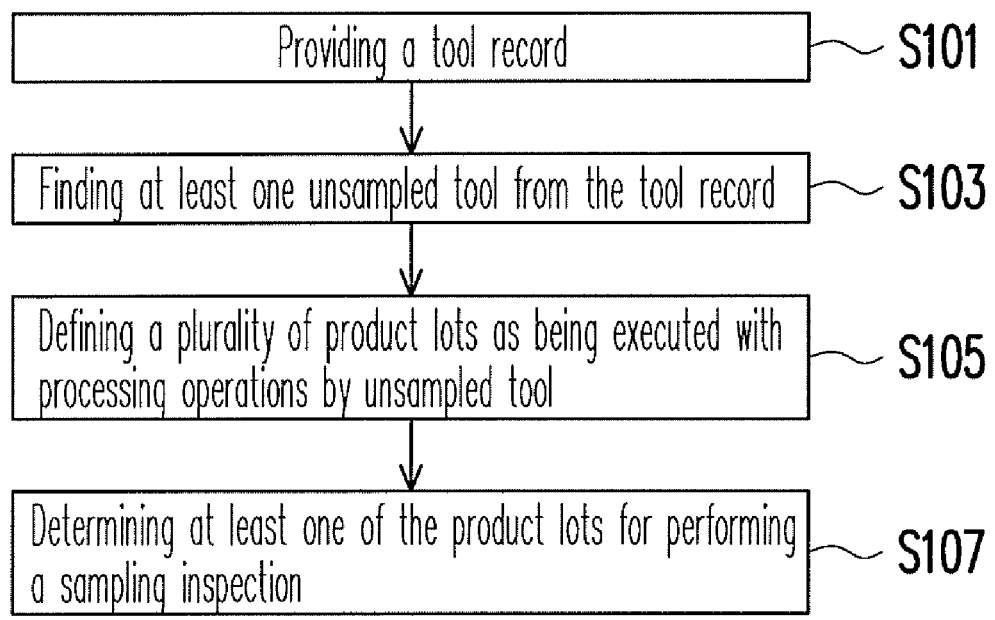
FIG. 1 is a schematic flow chart illustrating a sampling inspection method according to an embodiment of the present invention.

Reference will now be made in detail to the present preferred embodiments of the invention, examples of which are illustrated in the accompanying drawings. Wherever possible, the same reference counting numbers are used in the drawings and the description to refer to the same or like parts.

FIG. 1 is a schematic flow chart illustrating a sampling inspection method according to an embodiment of the present invention. Referring to FIG. 1, in a multi-product production line including a plurality of tools, a tool record is provided at step S101. The tool record records a sampling data of each of the tools. The multi-product production line for example is a production line adapted for producing a plurality of different types of products. The tools of the production line are grouped into a plurality of tool groups according to a process type performed by each of the tools. Further, each of the sampling data records a latest inspection time of a corresponding tool.

FIG. 2 is schematic diagram illustrating a tool record according to an embodiment of the present invention. Referring to FIG. 2, in this embodiment, a tool record 200 lists 70 tools employed in the multi-product production line. The 70 tools are grouped into 8 tool groups (A, P, ST, C, SI, PA, SIN, and H), according to the process type performed by each of the tools. The aforementioned tools, for example can be process machines, or process chambers of a process machine. Further, each of the tool group is set with a predetermined inspection cycle. The predetermined inspection cycle is set according to operation abnormal rate of the tool, or the process importance of the tool groups. According to an embodiment of the present invention, the higher the process importance of a tool group is, the shorter the predetermined inspection cycle is. According to another embodiment of the present invention, a tool group with higher total product yield is set with a shorter predetermined inspection cycle.

Further referring to FIG. 2, in the tool record, each tool is represented by a code. Each tool data in the tool record records a sampling data for recording a latest inspection time of the corresponding tool. Taking the code A01 for example, a lasts inspection time of a product lot corresponding to the tool A01 is 15 O'clock 30 minutes on Sep. 30, 2007.

Then, referring to FIG. 1, at step S103, each sampling data recorded in the tool record 200 corresponding to each tool is checked to find out at least one unsampled tool from the tool record 200. In other words, when a latest inspection time of a tool does not happen within a predetermined inspection cycle of a tool group including the tool, the sampling data of the tool is then marked as unsampled. Referring to FIG. 2, according to an embodiment, in the tool record 200, the latest inspection times of the tool ST09 of the tool group ST, the tool PA10 of the tool group PA, and the tool H01 of the tool group H do not happen within the predetermined inspection cycles of the tool groups of the tool groups ST, PS, and H, respectively. In other words, the latest inspection times of the tool ST09, the tool PA10 and the tool H01 are much earlier than the predetermined inspection cycle corresponding to the tool group ST, tool group PA and tool group H respectively, and therefore, these tools are marked as uninspected tools/unsampled tool, boldly framed as shown in FIG. 2.

Figure 3:
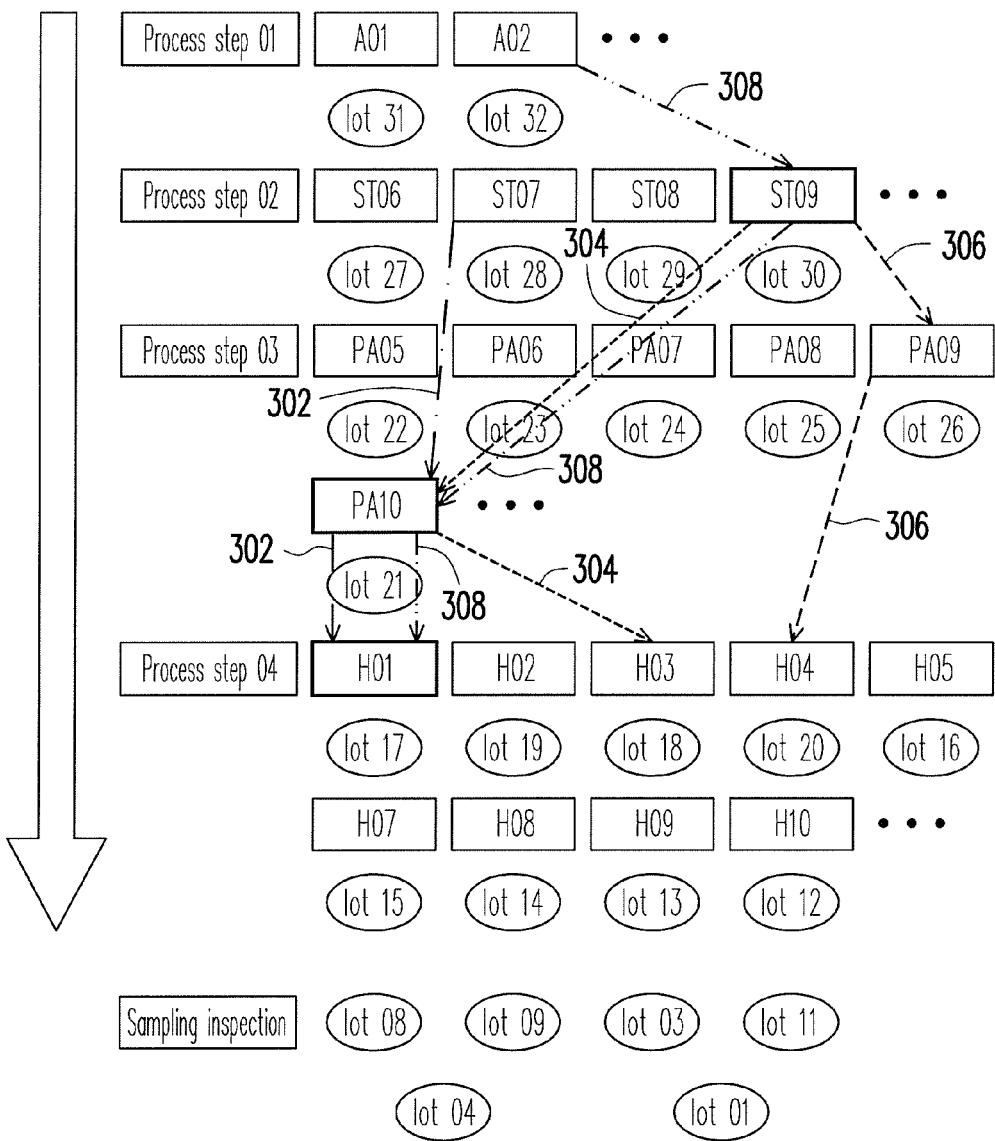
FIG. 3 is a schematic diagram illustrating a relationship between process tools and process steps according to an embodiment of the present invention.

Then, at step S105, a plurality of product lots is confirmed as being performed with at lest one process operation by at least one unsampled tool. FIG. 3 is a schematic diagram illustrating a relationship between process tools and process steps according to an embodiment of the present invention. Referring to FIG. 3, according to an embodiment, the process steps include process step 01, process step 02, process step 03, and process step 04. The process step 01 can be performed by at least tool A01 and tool A02. The process step 02 can be performed by at least tool ST06, tool ST07, tool ST08, and tool ST09. The process step 03 can be performed by at least tools PA05 through PA10. The process step 04 can be performed by at least tools H01 through H10.

It is found that that the tools ST09, PA10, and H01 are unsampled tools from the tool record 200 of FIG. 2. Referring to FIG. 3, it shows process tool paths 302, 304, and 306. According to the process tool path 302, the product lot 17 currently at the tool H01 for the process step 04, has been previously performed with the process step 02 by the tool ST07, and subsequently performed with the process step 03 by the tool PA10. That means the process tool path of the product lot 17 includes two uninspected tools PA10 and H01. Similarly, as for the process tool path 304, the product lot 18 currently at the tool H03 for the process step 04, has been previously performed with the process step 02 by the tool ST09, and subsequently performed with the process step 03 by the tool PA10. That means the process tool path of the product lot 18 includes two uninspected tools ST09 and PA10. Likewise, the process tool path 306 shows that the product lot 20 currently at the tool H04 for the process step 04 has been previously performed with the process step 02 by the tool ST09, and subsequently performed with the process step 03 by the tool PA09. That means the process tool path of the product lot 18 includes one uninspected tool PA09. As such, the product lots 17, 18, and 20 are determined as product lots being processed with at least one process step by at least one unsampled tool.

Then, referring to FIG. 1, at step S107, at least one of the product lots is determined for sampling inspection. Preferably, a process tool path of the product lot determined for sampling inspection includes at least two unsampled tools. In another embodiment of the present invention, the step of determining at least one of the product lots for sampling inspection further includes determining one of the product lots as a prior sampling product lot, according to a priority selecting rule. The priority selecting rule includes: a product corresponding to the prior sampling product lot with a maximum production amount. According to another embodiment, the priority selecting rule includes: the prior sampling product lot having a ready-to-inspect recipe. According to a further aspect of the embodiment, the priority selecting rule includes: a process tool path of the prior sampling product lot including most amount of unsampled tools, so that a plurality of unsampled tools can be sampled by single sampling step. In this case, as shown in FIG. 3, the process tool path of the product lot 17 includes two uninspected tools, and therefore the product lot 17 becomes a prior sampling product lot in accordance with the priority selecting rule.

In the foregoing embodiments of the present invention, after checking the tool record 200 and finding out the uninspected tools, and after the product lots are completed with the process procedure, those product lots with process tool paths including at least one uninspected tool are sampled for inspection. The aforementioned method of sampling and inspecting the product lots is performed in a passive way. That is, the product lots are selected according to the process tool paths thereof after the product lots being performed with the process steps by the uninspected tools. However, the present invention is not limited to be sampled and inspected by the foregoing passive method.

Figure 4:
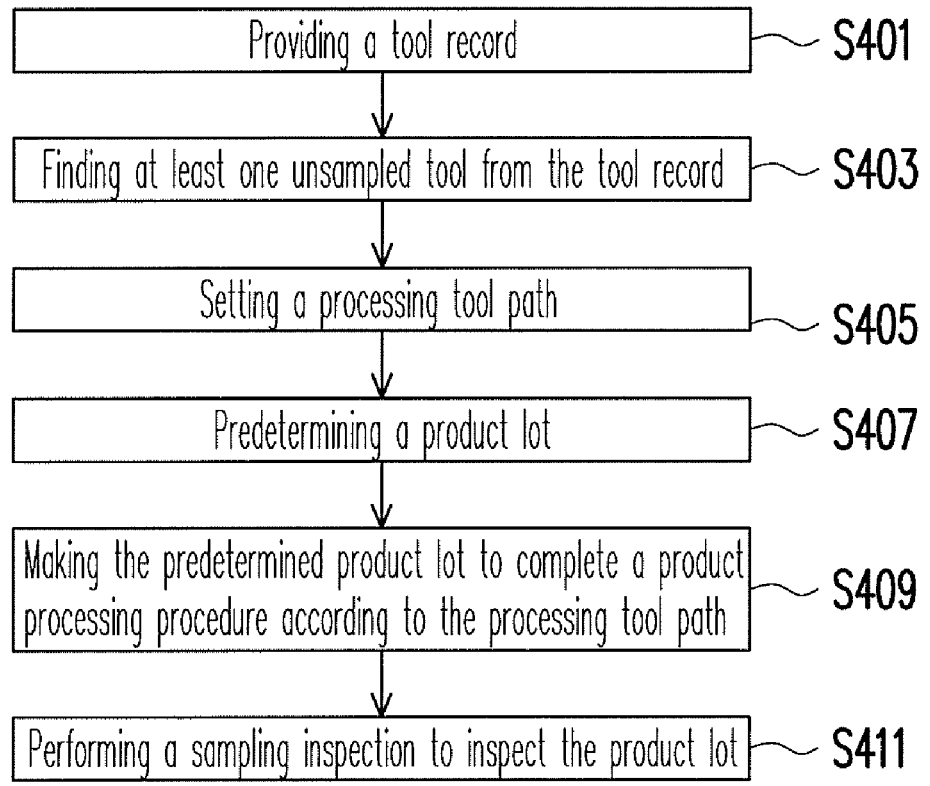
FIG. 4 is a schematic flow chart illustrating a sampling inspection method according to an embodiment of the present invention.

FIG. 4 is a schematic flow chart illustrating a sampling inspection method according to an embodiment of the present invention. Referring to FIG. 4, in this embodiment, at step S401, a tool record is provided. The sampling data recorded in the tool record, the tool mode, and the storage grouping as shown in FIG. 2, are similar to the description made in the foregoing embodiments, and are not to be iterated herein.

The, at step S403, each sampling data recorded in the tool record is checked to find out at least one unsampled tool/uninspected tool from the tool record. The method of finding out at least one unsampled tool/uninspected tool from the tool record has been discussed in the step S103 in the foregoing embodiment, and thus is not iterated herein.

Then, at step S405, a process tool path is set. And at step S407, a product lot is predetermined according to the set process tool path. The set process tool path includes at least two unsampled tools. In other words, referring to FIGS. 3 and 4, a set process tool path including at least two unsampled tools is actively determined, according to the uninspected tools found out in the step S403 (similar as the tools ST09, PA10, and H01 shown in FIG. 2). Preferably, such a process tool path (e.g., the process tool path 308 of FIG. 3) includes all unsampled tools (i.e., tools ST09, PA10, and H01). In other words, as shown in FIG. 3, the determined process tool path 308 is determined and, according to product types corresponding to the determined process tool path 308, product lot 32 predetermined to perform the process step 01 with the tool A02 and not yet been performed with the process steps 02, 03 and 04 will serve as a product lot to be sampled for inspection later.

Then, referring to FIGS. 3 and 4, at step S409, the product lot 32 is completed with a product process procedure according to the set process tool path 308. Then at step S411, a sampling inspection is performed to the product lot 32. Because the product lot 32 is completed with the product manufacturing procedure according to the set process tool path 308 and the set process tool path 308 includes most of the uninspected tools/unsampled tools, a single time of sampling inspection to the product lot 32 can achieve the results of inspecting process performances of a plurality of uninspected tools at the same time. In such a way, the present invention is adapted for simplifying the sampling inspection procedure, and saving the time required for sampling inspection, and thus improving the production capability.

In the present invention, the tool record is adapted for instantly refreshing the latest sampling data, and the uninspected tools which fail to update the sampling data within the predetermined inspection cycle can be learnt from the tool record. After knowing sampling data of the uninspected tools, process performances of a plurality of tools can be inspected by sampling a specific product lot. Because the specific product lot is inspected upon the condition of knowing the sampling data of the uninspected tools, all tools in operation of the production line can be sampled for inspection within a predetermined cycle for at least one time. Therefore, the present invention provides a solution to the blind spots of the random sampling. Further, the product lots can be passively sampled for inspection, or actively sampled by setting a process tool path to select a specific product lot for inspection, so as to inspect process performances of a plurality of uninspected tools via a single sampling inspection process. In such a way, the present invention is adapted for simplifying the sampling inspection procedure and saving times spend on sampling inspection, and thus improving the production capability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sampling inspection method, adapted for a multi-product production line having a plurality of tools, comprising:
   providing a tool record, wherein the tool record records a sampling data of each of the tools and the sampling data of each of the tools records a latest inspection time of the corresponding tool;
   checking each sampling data recorded in the tool record, for finding out at least one unsampled tool from the tools, wherein the tool is regarded as the unsampled tool when the latest inspection time of the tool does not happen within a predetermined inspection cycle corresponding to the tool;
   defining a plurality of product lots as being performed with at least one process operations by at least one of the unsampled tools; and
   determining at least one of the product lots for performing a sampling inspection.

2. The sampling inspection method according to claim 1, wherein a process tool path of the determined product lot for performing the sampling inspection comprises at least two unsampled tools.

3. The sampling inspection method according to claim 1, wherein the tools include a process machine.

4. The sampling inspection method according to claim 1, wherein the tools include a process chamber.

5. The sampling inspection method according to claim 1, wherein the tools recorded in the tool record are grouped into a plurality of tool groups according to a process type performed by each of the tools, and each of the tool groups has the corresponding predetermined inspection cycle.

6. The sampling inspection method according to claim 5, wherein the step of finding out at least one unsampled tool from the tools further comprises:
in the predetermined inspection cycle corresponding to each of the tool group, finding out at least one of the tools as the unsampled tool, and a corresponding sampling data of the unsampled tool being marked as unsampled.

7. The sampling inspection method according to claim 1, wherein the step of determining at least one of the product lots for performing the sampling inspection further comprises:
determining one of the product lots as a prior sampling product lot according to a priority selecting rule.

8. The sampling inspection method according to claim 7, wherein the priority selecting rule comprises:
the prior sampling product lot corresponding to a product having a maximum production amount.

9. The sampling inspection method according to claim 7, wherein the priority selecting rule comprises:
the prior sampling product lot having a ready-to-inspect recipe.

10. The sampling inspection method according to claim 7, wherein the priority selecting rule comprises:
a process tool path of the prior sampling product lot comprising the most unsampled tools.

11. A sampling inspection method, adapted for a multi-product production line having a plurality of tools, comprising:
providing a tool record, wherein the tool record records a sampling data of each of the tools and the sampling data of each of the tools records a latest inspection time of the corresponding tool;
checking each sampling data recorded in the tool record for finding out at least one unsampled tool from the tools, wherein the tool is regarded as the unsampled tool when the latest inspection time of the tool does not happen within a predetermined inspection cycle corresponding to the tool;
setting a process tool path comprising at least two unsampled tools;
predetermining a product lot according to the process tool path;
making the product lot to complete a product manufacturing procedure according to the process tool path; and
performing a sampling inspection to inspect the product lot.

12. The sampling inspection method according to claim 11, wherein the tools include a process machine.

13. The sampling inspection method according to claim 11, wherein the tools include a process chamber.

14. The sampling inspection method according to claim 11, wherein the tools recorded in the tool record are grouped into a plurality of tool groups according to a process type performed by each of the tools, and each of the tool groups has the corresponding predetermined inspection cycle.

15. The sampling inspection method according to claim 14, wherein the step of finding out at least one unsampled tool from the tools further comprises:
in the predetermined inspection cycle corresponding to each of the tool group, finding out at least one of the tools as the unsampled tool, and a corresponding sampling data of the unsampled tool being marked as unsampled.

* * * * *